(12) United States Patent
Jiang (10) Patent No.: US 12,401,637 B2
(45) Date of Patent: Aug. 26, 2025

(54) SMART PASSWORD IMPLEMENTATION METHOD, APPARATUS, ELECTRONIC DEVICE AND COMPUTER-READABLE MEDIUM

(71) Applicant: Yunfan Jiang, Changzhou (CN)

(72) Inventor: Yunfan Jiang, Changzhou (CN)

( * ) Notice: Subject to any disclaimer, the term of this patent is extended or adjusted under 35 U.S.C. 154(b) by 287 days.

(21) Appl. No.: 18/026,838

(22) PCT Filed: Dec. 16, 2021

(86) PCT No.: PCT/CN2021/138583
§ 371 (c)(1),
(2) Date: Mar. 17, 2023

(87) PCT Pub. No.: WO2022/174665
PCT Pub. Date: Aug. 25, 2022

(65) Prior Publication Data
US 2024/0031356 A1      Jan. 25, 2024

(30) Foreign Application Priority Data
Feb. 16, 2021   (CN) .......................... 202110182503.5

(51) Int. Cl.
*H04L 9/40*         (2022.01)
(52) U.S. Cl.
CPC .................. *H04L 63/083* (2013.01)
(58) Field of Classification Search
CPC ....... H04L 63/083; H04L 67/02; H04L 63/06; H04L 63/1408; H04L 63/20; G06F 21/46
(Continued)

(56) References Cited

U.S. PATENT DOCUMENTS 9,626,506 B1    4/2017   Shetty et al.
2009/0077371 A1  3/2009   Powell et al.
(Continued)

FOREIGN PATENT DOCUMENTS

CN    104391874 A    3/2015
CN    108011892 A    5/2018
(Continued)

OTHER PUBLICATIONS

Databases and computer crimes, Simundic et al, Sep. 2010 (Year: 2010).*

*Primary Examiner* — Jahangir Kabir
(74) *Attorney, Agent, or Firm* — Bayramoglu Law Offices LLC (57) ABSTRACT

A smart password implementation method, an apparatus, an electronic device, and a computer-readable medium comprises: obtaining management request information sent by a user terminal, where the management request information comprising a password change request, a password change template setting, and a password change frequency setting; generating a password to be changed; obtaining a polling request from a target device/facility for information to be changed, or sending to the target device/facility the information to be changed; obtaining change feedback information sent by the target device/facility; and sending the change feedback information to the user terminal. The present invention solves the problems that the password is easy to lose, forget and leak, that the change wastes time and labor, and the problems of the resulted associated changes, which enables password management to be more compliant.

19 Claims, 5 Drawing Sheets

(58) Field of Classification Search
USPC .............................................. 726/6
See application file for complete search history.

(56) References Cited

U.S. PATENT DOCUMENTS

| | | | |
|---|---|---|---|
| 2010/0199336 A1* | 8/2010 | Tan | ........................ H04L 9/3228 |
| | | | 726/6 |
| 2017/0011214 A1 | 1/2017 | Cavanagh et al. | |
| 2018/0375645 A1 | 12/2018 | Hanumantharau et al. | |
| 2020/0112585 A1* | 4/2020 | Keohane | ............... G06F 21/316 |

FOREIGN PATENT DOCUMENTS

| | | |
|---|---|---|
| CN | 110210191 A | 9/2019 |
| CN | 110719298 A | 1/2020 |
| CN | 113225305 A | 8/2021 |
| JP | H09231174 A | 9/1997 |
| JP | 2005107801 A | 4/2005 |
| JP | 2010092134 A | 4/2010 |
| JP | 2017111809 A | 6/2017 |
| JP | 2019505941 A | 2/2019 |

* cited by examiner

SMART PASSWORD IMPLEMENTATION METHOD, APPARATUS, ELECTRONIC DEVICE AND COMPUTER-READABLE MEDIUM

CROSS-REFERENCES TO THE RELATED APPLICATIONS

The application is a national stage entry of PCT/CN2021/138583 filed on Dec. 16, 2021, which claims priority to Chinese patent applications No. 202110182503.5 filed on Feb. 16, 2021, the entire contents of which are incorporated herein by reference.

TECHNICAL FIELD

The present application relates to the field of information security, and in particular, to a smart password implementation method and apparatus, an electronic device, and a computer-readable medium.

BACKGROUND

In the current era, informatization is the megatrend of development and represents advanced productivity, and humans are entering the informatization era from the industrial era. With the increasing importance of information security, many security technologies and standards are generated.

Among the related technology, the password in the information system is still mainly being manually changed, which has the characteristics of subjectivity, randomness, and difficult compliance.

In practice, the inventor found at least the following problems in the technology:

The complexity of today's information systems results in considerable difficulty in changing passwords regularly. In addition, individuals and organizations all need to memorize many passwords by either recording the password on the paper or into an electronic document, which are not only easy to lose the password but also to leak to cause various hidden risks. As for the question and answer of password protection, it is almost never changed after set. It is also usually the case that one might lose and forget passwords, thereby frequently requiring resetting and appeals that are time-consuming and laborious. One change of passwords in production database in a medium scale information system may take several hours and may require the presence of a customer chief information officer, business system responsible person, a database administrator, a system operator and maintenance person and a business system implementation personnel. Therefore, password management becomes an obvious weak spot in information system security.

SUMMARY

To solve the problems that passwords are easy to be lost, forgotten, leaked, time-consuming and labor-intensive to change, and associated changes, the present disclosure provides a smart password implementation method and apparatus, an electronic device, and a computer-readable medium.

First aspect, a smart password implementation method provided in this application adopts the following technical solutions:

A smart password implementation method is applied to a password center server, and includes the following steps:

obtaining management request information sent by a user terminal, where the management request information includes a password change request, a password change template setting, and a password change frequency setting;

generating a to-be-changed password according to the password change template, the password change request or the password change frequency, and generating to-be-changed information of the target device/facility according to the to-be-changed password, the password change request or the password change frequency;

performing a password change operation of the target device/facility according to the to-be-changed information, or providing the target device/facility with the to-be-changed information for executing the password change operation to the target device/facility;

generating change feedback information, or obtaining change feedback information sent by the target device/facility, where the change feedback information includes a change result;

sending the change feedback information to the user terminal.

In some embodiments, the method further includes the following steps:

acquiring registration request information of a target device/facility;

sending confirmation request information of the target device/facility to a user terminal;

acquiring registration confirmation information fed back by the user terminal.

By adopting the above technical solution, the target device/facility may be registered in the password center server.

In some embodiments, the target device/facility includes a local device/facility, a remote device/facility, or an associated device/facility associated with the local or remote device/facility.

By adopting the above technical solution, in addition to performing password change management on local and remote devices/facilities, the associated devices/facilities can be synchronously changed and managed at the same time.

In some embodiments, there are a plurality of password center servers, each of which has a unique password center identification code, and data synchronization and information pushing are performed between the plurality of password center servers; and the trusted password center server can realize one-key login of the target device/facility managed by another password center server.

By adopting the above technical solution, a plurality of password center servers can be used for data sharing or disaster tolerance; and the trusted server can perform data synchronization with servers with other password center identification codes to realize data redundancy, and can provide functions such as smart account management and one-key login, which is more convenient for users to use.

In some embodiments, the target device/facility can automatically change the password of itself as needed after password verification, interception and merging and splicing.

In some embodiments, the password includes and is not limited to a static password, a password protection question and answer, a digital certificate, a digitized asset, a port for non-public access, a community strings, and an application context.

By adopting the above technical solution, the password that can be changed by the target device/facility includes, but is not limited to, the foregoing plurality of categories. In addition to managing conventional static passwords, the password center server may also perform protection changes on other various information, ports, etc. so as to greatly improve security.

In some embodiments, the management request information includes control instructions for managing password center servers, managing a target device/facility, or authorizing others to manage a target device/facility; the manner of managing the target device/facility includes, but is not limited to, immediately shutting down, disabling or allowing login, forcing logout, and starting/stopping a service or an application etc. The management of the password center server includes, and is not limited to, adjusting the time window of the user using the password center, allowing or disabling the user to use the password center (or some functions therein), etc.

By adopting the above technical solution, special control can be performed on the password center server and the target device/facility through the control instruction, so as to realize more perfect management.

Second aspect, a smart password implementation method provided in this application adopts the following technical solutions:

A smart password implementation method is applied to a user terminal and includes the following steps:

sending management request information to a password center server, wherein the management request information includes a password change request, a password change template setting and a password change frequency setting; The password change template, the password change request or the password change frequency is used by the password center server to generate to-be-changed information of a target device/facility; The to-be-changed information is used by the password center server to execute a password change operation of the target device/facility and generate change feedback information, or the to-be-changed information obtained from the password center server is used by the target device/facility to execute the password change operation and send change feedback information to the password center server, where the change feedback information includes a change result.

acquiring change feedback information sent by the password center server.

Third aspect, a smart password implementation method provided in this application adopts the following technical solutions:

A smart password implementation method is applied to a target device/facility, and includes the following steps:

obtaining to-be-changed information provided by a password center server, wherein the to-be-changed information is obtained by polling the password center server or sent by the password center server; The to-be-changed information includes a to-be-changed password, a password change request or a password change frequency; And the to-be-changed password is generated by a password center server according to a password change template, a password change request or a password change frequency; And the password change template, the password change request or the password change frequency is sent by the user terminal to the password center server;

performing a password change operation according to the to-be-changed information;

sending change feedback information to the password center server, where the change feedback information is used by the password center server to send the change feedback information to the user terminal; The change feedback information includes a change result.

Fourth aspect, an apparatus for implementing smart password change provided in this application adopts the following technical solution:

A smart password implementation apparatus is applied to a password center server, and includes:

a management request information obtaining module, configured to obtain management request information sent by a user terminal, where the management request information includes a password change request, a password change template setting, and a password change frequency setting;

a to-be-changed information generation module, configured to generate a to-be-changed password according to the password change template, the password change request or the password change frequency, and generate to-be-changed information of the target device/facility according to the to-be-changed password, the password change request or the password change frequency;

a password change execution module, configured to execute a password change operation of the target device/facility according to the to-be-changed information, or provide the target device/facility with the to-be-changed information for executing the password change operation to the target device/facility;

a feedback obtaining module in a server, configured to generate change feedback information, or obtain change feedback information sent by the target device/facility, where the change feedback information includes a change result;

a feedback sending module in a server configured to send the change feedback information to the user terminal.

Fifth aspect, an apparatus for implementing smart password change provided in this application adopts the following technical solution:

A smart password implementation apparatus is applied to a user terminal and includes:

The management request information sending module is configured to send management request information to a password center server, where the management request information includes a password change request, a password change template setting, and a password change frequency setting. The password change template, the password change request, or the password change frequency is used by the password center server to generate a to-be-changed password. The to-be-changed password, the password change request or the password change frequency is used by the password center server to generate to-be-changed information of a target device/facility. The to-be-changed information is used by the password center server to execute a password change operation of the target device/facility and generate change feedback information, or for the target device/facilities to perform a password change operation after obtaining it from the password center server, and send change feedback information to the password center server, where the change feedback information includes a change result;

the terminal feedback obtaining module, configured to obtain change feedback information sent by the password center server.

Sixth aspect, a smart password implementation apparatus provided in this application adopts the following technical solution:

A smart password implementation apparatus is applied to a target device/facility, and includes:

The to-be-changed information obtaining module is configured to obtain to-be-changed information provided by the password center server, where the to-be-changed information is obtained by the target device/facility polling to the password center server or sent by the password center server; The to-be-changed information includes a to-be-changed password, a password change request or a password change frequency; The to-be-changed password is generated by the password center server according to the password change template, the password change request or the password change frequency; The password change template, the password change request or the password change frequency is sent by the user terminal to the password center server.

a change execution module, configured to perform a password change operation according to the to-be-changed information;

a device feedback-sending module, configured to send change feedback information to the password center server, where the change feedback information is used by the password center server to send the change feedback information to the user terminal, and the change feedback information includes a change result.

Seventh aspect, a smart password implementation system provided in this application adopts the following technical solutions:

A smart password implementation system includes: a password center server, a user terminal connected to the password center server, and a target device/facility connected to the password center server;

The password center server includes the foregoing smart password implementation apparatus; the user terminal includes the foregoing smart password change implementation apparatus; and the target device/facility includes the foregoing smart password change implementation apparatus.

Eighth aspect, this application provides an electronic device, and the following technical solutions are used.

An electronic device includes:

at least one processor;

a storage device, configured to store at least one computer program;

When the at least one computer program is executed by the at least one processor, at least one processor implements the smart password change implementation method.

Ninth aspect, this application provides a computer-readable medium, and the following technical solutions are used:

A computer readable medium having a computer program stored thereon. The computer program, when executed by a processor, implements the smart password implementation method.

To sum up, the present application includes at least one of the following beneficial technical effects:

1. The present method adopts an intelligent password management mode dominated by a user, and solves various problems in password management such easy loss, forgetting, leakage, compliance generation of passwords and changing.

2. The password is changed according to the preset of password change template and the password change frequency, thereby ensuring the compliance of password management.

3. The present invention solves the defects that the user wastes time and labor on changing the password subjectively and randomly without compliance, and especially promotes the password management of device/facility in an enterprise-level information system to conform to various security standard specifications.

4. In addition to making conventional static password intelligent, various password protection questions and answers, digital certificates, digital assets, ports in non-public access paths, community character strings, application contexts and the like can also be changed and managed, while automatic change and notification and control instruction execution are all not powered by traditional passwords.

5. The user's own target device/facility may be managed, and others may be authorized to manage the target device/facility; while managing the designated device/facility, the management of the associated device/facility may also be performed at the same time.

6. A password center server can be established on the same device of the user terminal, so that one-click login is implemented to greatly facilitate the use of a complex password, and one-click login and one-click logout are realized by pushing the session information between the password center servers.

DETAILED DESCRIPTION OF THE EMBODIMENTS

The present application will be further described in detail below with reference to FIGS. 1 to 6.

Embodiments of the present application disclose a smart password implementation method and apparatus. A password center server (i.e. a smart password center) and a ubiquitous client thereof are implemented so that people do not need to change a password of various facility accounts of an information system in a manual manner every time. A password generating and changing program, a password template/change frequency management program, and a message service program form a intelligent password management core; the password template/change frequency management program accepts the password template/change frequency request sent by the facility owner; the password generating changing program generates a new password according to the specified password template/change frequency and time window and automatically executes the password change operation, including the local device/facility password and the associated device/facility password. The client program is executed on the target device/facility to apply for registration to the password center server, and may obtain the password of the specified node facility account after getting the registration authorization, and change the facility password or change the association facility password within the desired time window. The password/facility account owner is notified with the result by the message service program, whether changing locally or remotely, while the password/facility account owner can query and adjust the password template and the change frequency.

An implementation manner of the smart password is that the innovation in password generation, storage, use, change and destruction is different from that of a traditional password, and there are automatic change and notification and execution of control instruction which a traditional password does not have. Traditional passwords, unless limited by system, rely on the subjectivity of the password owner (password complexity and change period); some application systems require that the password has a certain complexity and a certain change period, but finally the password owner needs to change personally; the memory of the traditional password completely depends on the owner of the password, by memory or by writing somewhere (on paper or in the file of the mobile phone and computer), the former is easily forgotten, the latter is easily lost or compromised, and forgetting or losing recording media is also very common; at present, the lost password/reset password varies in different applications, the most is by mobile phones or mailbox, the former is not safe enough, and the latter also involves a password. Although the security question and answer are relatively secure, they apparently needs more memory; a common mobile phone verification code login mode is generally used in a temporary occasion, and unexpected difficulties are often faced when a mobile phone is replaced or lost. Of course, the manner of the smart password does not completely replace these traditional password methods. The smart password and the traditional password may coexist and be interchanged. For example, the smart password may be enabled to automatically update the traditional password. The traditional password may disable the smart password only by manual change to revert to the traditional password, and switch to the smart password at any time when needed.

In the embodiments of this application, the control instruction is used to manage a password center server, manage a target device/facility, or authorize other people to manage a target device/facility, and may also manage a time window and a source address of the two. The manner of managing the target device/facility includes immediately shutting down, disabling or allowing login (including password login and non-password login), forcing logout, starting/stopping a service or an application. The time window of the target device/facility is set by the password center server accepting the user's settings, specifically including performing or disabling the execution of a password change or some management command within the allowed time range because the device/facility is not always guaranteed to be always on at the non-serving end, and some tasks may be missed if only time alignment is available; same for uninterruptable task on device/facility needs ensured to guarantee the safety of the device/facility main business through time window. After all, the smart password system is only additional, the original functions of the device/facility cannot be ignored. The time window of the password center server itself refers to security, and the system administrator may designate certain users or some users to set that the designated account can only request the smart password function in certain time windows.

In the embodiments of this application, a target device/facility that needs to change a password is specifically defined as a node, a facility, and an account. All the three parts may be generalized. When a password generated by a smart password center needs to be automatically applied, a node should be a device with an IP address and network reachable or a device with a physical link that can communicate, for example, a router/switch, a NAS/SAS, a PC/server, and the like. For a specific node facility such as an embedded device, an industrial control device and the like should have relevant API interfaces; the facility can refer to various business systems, an operating system itself, a database, an application server, and other system services, and an account thereof usually has a login/accessible characteristic, thus apart from the natural account, it may further include a specific port of the IT system, a specific community string of the network device, an application context of the service system, and the like. The node, the facility, the account and the owner, i.e. the management user, are in many-to-many relationships, and there may be a certain level difference between the management users, so that the high-level user may manage the facility of the lower-level user.

In the embodiments of this application, a port in a non-public access path typically includes a 22 SSH default remote access port and a 3389 Windows remote desktop access port; the community string is accessed by the SNMP simple network protocol to use the MIB management information base to obtain much information of the object; the application context, for example, the console context of the application server WebLogic. Generally, the information does not need to be open to the public, instead to ensure it can only be accessed by authorized personnel is the most important, while making it dynamic can effectively avoid illegal detection and access. These information are generally stored in configuration files (some in registries under Windows), and a specific program can be written for modification. The program is triggered in a preset change frequency window by the smart password generation program, and the change result and the next change time are notified by the message system to the administrator, thereby ensuring that the maintenance work of the administrator is not hindered, and the necessary access information is hidden from the outside; in addition, the smart password system also triggers an associated change, so that the system or application that needs to access the information changes their access configuration at the same time to ensure the acquisition of the necessary information, of which the most typical is an operation and maintenance system. For a port template, a port that is not used by other programs in the system should be selected, and it should be a numerical range. For example, a 22 port may use 40000-49999. If the change is once per hour, its template may use a random number between 4+0-9999, or 4% m % d % h may also be used to ensure no duplicate within 10 months such as 41123 41153 41183. However, the community string and application context may have a wider range as long as some special symbol template definitions are excluded.

In the embodiments of this application, the password template/change frequency basic specifier YymdHMwS (year month day hour minute week season), specifically, may be adjusted according to needs when implemented, and may determine an encoding number/length according to a life cycle of the system, and select a suitable format word; wherein Y is a character referring to the relative year, y is a 2-character year, the mdHMwS each is represented by a single character, and a % in front of the specifier is added for accurate template with a fixed sequence. Otherwise, a random order template is generated during input parsing, if the minimum length is less than 8-bit then characters or symbols are inserted randomly, and a user-specific character sequence is managed so that each password template (per person) is different; the change frequency should be matched with the password template, for example, Yw,w1.8:w3 (a pre-defined password template before the comma and a change frequency after the comma) indicates changing password at 8 clock first Monday of every three weeks. The template includes year and week so that the template specifically generated contains % Y and % w. Of course the order is randomly determined. Therefore, the certain template generated by the user (for example, yunfan) may be F % w #un % Yy&. If no extended specifier % r is used, each time the same password except year and week is generated by the template, while adding the % r makes the password generated each time has different order and cannot be guessed. Apart from the password template/change frequency, extension information can be input, including password protection question and answer, associating change script name, region/network address and time protection, etc. However, in the system implementation, the foregoing input mode is only one of the basis, and the more practical is a shortcut template that appears in the form of HTTPS links in the webserver, for example, "Click to generate a 3-week change password template", "Click to generate a template for 3-month change password", and so on. In addition, there are at least the following three types: through web program, through mobile APP and through voice, among which the password changes of the mobile device (system and application) can be simultaneously implemented by using the mobile APP, meanwhile, fine management is achieved with a good user experience. The shortcut template is randomly determined as an accurate template by the system according to the basic specifier. At the same time, the shortcut template (or called system custom template) may also be manually input by the user to implement the melon operation, which may change the password according to the user's selection, for example, every 2 months. The custom template may only be ym, randomly generates at least eight characters of the exact template and store it, and then to the full minute the password center server generates a new password according to the template and predefined frequency, and sends the new password to the user terminal along with the next change time.

Figure 1:
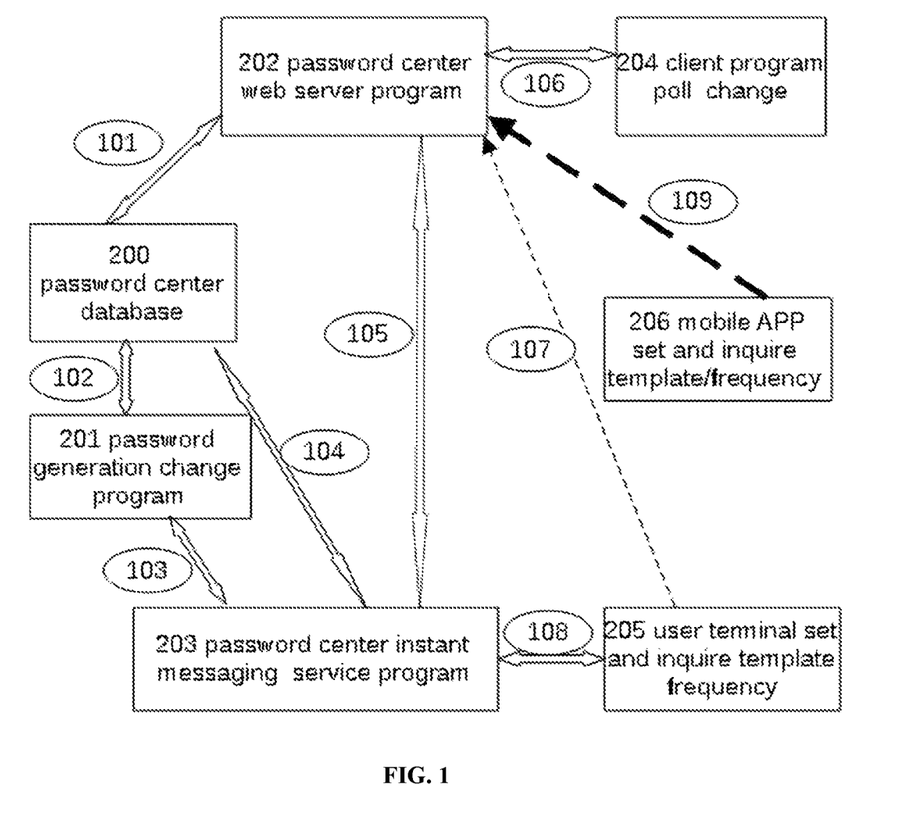
FIG. 1 is a schematic architectural diagram of a password center server according to an embodiment of this application.

As shown in FIG. 1, in the embodiments of this application, the smart password center includes a central database 200 and a password generating/changing program 201 (the two may be on the same host or on different hosts in the local area network. All hosts should turn on the firewall and enable a corresponding security policy. The link 102 may be encrypted by a plain code or a database), a password template/change frequency management program running in the password center webservice program 202 (the link 101 may have a firewall or a gateway added on), and a password center instant messaging service program 203 which receives and send notification messages (the link 103 is configured to notify the management user, the link 108 provides encrypted communication by the instant messaging server, the link 104 as internal instant messaging server directly accesses the password center database 200. If the external instant messaging server is used, the password center instant messaging service program 203 will be incorporated into the password center webservice program 202). The client program 204 performing a real change (link 106 usually uses encrypted access HTTPS, where the communication has two layers of password center private encryption protocol to ensure security) runs on nodes that need to change passwords or on altering the passwords of remote reachable node facilities (e.g. by setting SSH certificate trust), the latter of which better conforms to the needs of modern complex IT environments. The link 105 enables the password center webservice program 202 to notify the management user, the link 107 may let the user manage the password template in a web manner, though not mandatory, and the link 109 may allow the user to more finely manage the password template through the mobile app, but also not mandatory unless under a large environment.

In the embodiments of this application, on the node that needs to change the password, the management user initiates a registration request to specify facility and account with the client program 204 or the mobile APP 206, and then the smart password center responds the request and requests the user to confirm, then the management user can successfully register through the user terminal 205 such as the instant messaging client on the cellphone or the mobile APP 206 by confirmation; then the management user sets the password template/change frequency through the user terminal 205 or the mobile APP 206, the user can set owning precise fixed template, and can also use system predefined template and a function-based variable template, and meanwhile, the change frequency is set. The smart password center receives and analyzes the specific demand of the user to generate the determined password template, change frequency and extension information and then replies to the user for a confirmation input. The determined template is different each time unless the precise template is explicitly specified. The password generation program then sends the adopted password template and frequency and the next password change time to the management user. The management user can query all his nodes, facilities, and the passwords of accounts, including a password template and a change frequency, and a next change time according to the user level.

In the embodiments of this application, the following registration steps of the target device/facility may be implemented:

The password center server obtains registration request information of the target device/facility, where the registration request information may be sent by the owner of the target device/facility (For registration for the existing target device/facility in list table, this step can be skipped and the following two steps are directly performed);

sending, by a password center server, confirmation request information of the target device/facility to a user terminal; and The user terminal feeds back the registration confirmation information to the password center server.

In the embodiments of this application, the automatic registration process of the target facility: The premise is that the password center database already has the facility owner's account, and the management system of the facility itself ensures the legality of the facility owner, for example, the resigned cannot continue the following operations. The facility owner can enable the smart password by only sending an instruction, such as a question mark, to the instant messaging robot. The smart password system service program returns a link option for generating the password template and frequency once having received the message. After the facility owner clicks, the smart password system service program determines, according to the account, whether there is registration record of the person, if no, the smart password system service program automatically creates and generates the password template and frequency, and then sends the new password to the facility owner while updating the facility password of the owner in the original facility management system. The facility owner may also enable the smart password by sending an explicit password template/change frequency instruction to the instant messaging robot, which is more complex than the above, and needs to know the accurate semantics. The automatic registration of the client-free target device is substantially the same.

In the embodiments of this application, management user vs node/facility/account is a many-to-many relationship, and nodes, facilities, and accounts may be associated or even cross-centered.

In the embodiments of this application, the password generating program of the password center is a timed task, and is responsible for generating passwords for valid nodes, facilities, and accounts recorded in the central database according to the password template set by the user, calculating the next change time according to the change frequency, and sending necessary reminder information to the user, including notifying the management user of the node, the facility, and the account before the password change, so as to make a good change preparation if manual intervention is needed. The password generating program has the capability of changing the password of the local facility and the local reachable node and facility, and can directly change the password of the local facility and the password of the remote reachable (for example, by configured SSH certificate-based authentication) node and facility in the specified time window.

In the embodiments of this application, the password change template, the password change frequency, the to-be-changed password and the current password may be queried by the user terminal or the authorized target device/facility or actively sent by the password center server. Relevant information can all be actively queried by the user terminal or the target device/facility; or when entering into the change time window, the password center server actively sends a notification to the user terminal or the target device/facility according to the pre-defined/system default mode set by the owner to notify the to-be-changed or changed information.

The client keeping polling the password center Web server executes the password change once entering the password change time window, and the result can send to the password center and the management user or be written to the log. For the demanding and high security system (node, facility) the client can poll the multiple password centers to implement password verification, password synthesis, and password splicing. Different notification modes and notification objects may be used to ensure security, and at the same time, the client notification may be destroyed after reading to avoid the long-term visibility of received messages.

The smart password center implements password change without intervention of the password owner and conforms to the security requirements of the information system with respect to the password, and security is guaranteed through hybrid use of hierarchical content notification (such as aliases) and various notification modes. For example, a message reply may be divided into four levels (facility accounts can use alias, and the message can be sent over other message channels):

The first level only replies with the current password.

The second level replies with the current password+expiration time.

The third level replies with the current password+expiration time+the password template+the change frequency.

The fourth level replies with the current password+expiration time+password template+change frequency+specific API parameters;

Alias: Real facilities and the accounts are replaced with aliases, and are embodied in the first two levels' reply.

In the embodiments of this application, a message multi-channel reply manner may be used, and manners such as mail, instant messaging (private, public), short message, voice telephone and the like may be used in combination with a message channel.

The password template of the smart password center is determined by two methods: first is that an owner selects/inputs an accurate password template with frequency, and second is randomly generating a final password template according to the frequency. Finally, there are three kinds of password: first is to directly generate a random password, bypassing the password template, and the other two are based on password templates. One is to generate a final password with consistent format according to the password template, and the other is that the characters in the aforementioned final password are disordered.

The target device/facility which needs to obtain the change password from the two password centers should set the same precise template and change frequency to the two password centers if requiring verification, while any template may be set if only requiring splicing the obtained change passwords. The password changing for the client program application of the target device/facility may be executed inside the client program, while for some facilities requiring an additional program to change passwords, the client program may output the change password for other programs/scripts to change the password.

The management user interacts with the password center instant messaging server to set and query the password template and the change frequency, which can also be managed by the Web server management program or the mobile APP client; the interaction between the client and the password center uses at least two layers of symmetric encryption communication, of which the inner layer includes specific communication content of the node facility, including a password template, change frequency, a current password, an elapsed time, etc; the outer layer includes a timestamp, a management user account, a communication type (registration/polling/push/using such as one-click login), and an inner layer encryption string.

For a typical two-layer encryption, the encryption of the outer layer generally adopts a password center specific key, and the inner layer is encrypted by a node-facility-account specific key or in conjunction with a password center specific key. According to security needs and communication requirements, the password center specific key may be classified into three categories: a permanent token, a time-of-day token (changing per hour or day), a minute token (changing per minute and valid for a few minutes). The specific key token described above with a push communication object being the target device/facility is issued by the target device/facility.

To simplify information and keep proper privacy, in addition to low levels not displaying complete information, nodes, facilities, accounts may set alias.

The relationship between the smart password center and the user/password management in the existing information system: They may coexist and switch between each other. Taking an application system as an example, a new password (including a password changed every time on a specified password template and a change frequency) is updated to the system by using a smart password center to reset the password; changing the password once with the password change function of the system itself will disable the password change function of this facility in the smart password center, and then the password can still be reset by using the smart password center at any time. Other application systems may achieve the same effect, but the relevant interfaces should be customized if necessary.

The scalability of the smart password center may be as small as the use of only an individual, a domestic mini device such as a mobile phone, a tablet, a personal PC, etc., and may also be used in an organization/enterprise on any scale, even for social use; it can run in a router and an NAS server, and can also run in a dedicated server and can configure various clusters, disaster recovery and multi-center modes, the smart password center can use a self-built communication platform (instant messaging or short message), and can also use a public instant messaging platform with an API function, and determine whether to configure a web server according to needs. Generally, by expanding properly, the existing systems can have features of a smart password center and provide services in a corresponding manner.

When the password center server is trusted, for example, when a local password center (that is, a local server) is built in the device to which the user terminal belongs, the smart password implementation method applied to the user terminal may be performed by the local password center, and the result and the log may be recorded and inquired, and the one-click login to the target device/facility may be implemented.

When the password center server is established in the same device in the user terminal, data synchronization may be performed with all the target devices/facilities managed in the unit/organization/community/area network and password centers oriented to all the users, so as to implement the personal smart account center and realize one-click login to the target device/facility. In operation, the normal operation is further saving to the local password center (i.e. the local server) except for the first submission to the remote password center, then the local password center may be selected to push the verification information or call out the previous setting for editing and updating, and meanwhile, the received notification will also be saved in the local password center. The local password center may add a remote password center, a target device/facility, or a newly added target device/facility for the existing password center. The remote password center trust level may be displayed, and related information of a remote password center reaching a trust level may be viewed, for example, a password center synchronization situation on a computer or at home is displayed on a mobile phone.

When a password center is built in the device to which the target device/facility belongs, the smart password implementation method applied to the target device/facility may be executed by the password center, and the result and the log may be recorded and checked.

The implementation process of the embodiments of this application is as follows:

1) The existing environment is evaluated, a password center specification is determined, whether using an existing database or a new independent database is determined, a password template specification used by the password center, a password change frequency specification, a communication specification with the management user and the client are determined, and a password center key is determined.

2) The security and specification plans and countermeasures are evaluated, the risk factors of the whole implementation process are evaluated, the plans and countermeasures are determined through the implementation process to ensure that the implemented system is strong and effective. For example, considering device downtime/shutdown, device time difference, service shutdown/abnormality, network fluctuation and disconnection, password change failure caused by improper manual operation, various possible forgery and attacks, and the like. In particular, the key system should emphasize risk assessment and development specifications to ensure that password changes do not affect the normal operation of the system. The three time-windows and one limit of the extended information entry allowed for assessing change frequency are: the password is changed at a specified time window, the password center is accessed at the specified time window, the password is used at the specified time window, and the non-specified region/network address is restricted from accessing the password center and the specified node facility.

3) The password center database is created. It is recommended to use an existing database unless a mini-facility, such as a router, NAS, has to be used; a password center data dictionary is created, including at least a management user table (suggesting the use of existing user dictionary tables in order to use an off-the-shelf hierarchy and permissions definition), a password template/change frequency table, and a password change log table.

4) Writing a password generating and changing program, traversing effective records in a password center database, calculating the next change time according to each recorded password template/frequency (may need long time to debug and modify the specification), generating new password once entering the time window, updating the password template/frequency table and password change log table, notifying management user at the same time, and directly changing the password (different types of nodes and facilities will need different change modes) for the local node facility and the remote reachable facility.

5) A password center management program is written to implement input, query response and notification, and accept a management user setting node-facility-account and the password template/change frequency. The change frequency should be allowed to be separately modified, while it should be adapted to the password template. For example, the presence of the specifier with week/hour/minute in the template based on year-month and its change frequency is meaningless. The admin program involves two layers of decryption of receiving information and two layers of encryption of sending information, which respectively use the node key and the password center key.

6) A client program is written to generate a unique client node key, so as to implement a node registration request, a password query, and a password update. For a multi-password center, functions such as password comparison, password merging/splicing and the like may also be achieved, different types of facilities have different client codes, but the communication protocols with the password center are consistent. Client implementation manners in different operating systems are also different. For example, for a Windows client, C++ programming is suggested for facilitating use and ensuring compatibility, and a library such as OpenSSL/CURL is directly compiled, and the change of the password preferentially implements through modification instead of resetting the password. This is different from a non-Windows system and is specifically determined by a development specification, but communication with a password center should comply with the same encryption/decryption specification. Whether the password change is directly executed by the client program or is executed by calling the external program is determined by the facility type, for example, the password change for the operating system is generally executed directly by the client program. The reason why the extensive client is named is that due to the complexity of the facility, different types of node-facility need different client code and change modes, though the process of obtaining the change password is the same.

7) Creating instant messaging server service program, the private ones of which include XMPP robot, open source short message server, or that one can register to use a public instant messaging service with an API interface.

8) Joint test is performed to confirm that the target device/facility registration is normal, the password template/password change frequency setting is normal, the password generating and changing is normal, the user terminal queries and receives the notification normally, the target device/facility password can normally be automatically changed, and so the preliminary target is achieved, then the associate change and the multi-center function can be added, and the tests are performed one by one, and the same time it is gradually expanded to different facilities, applications and services to achieve generality.

9) The security test includes, but is not limited to, an abnormal input, a vulnerability scan, and a penetration test. The security test includes, but is not limited to, adaptability to various possible abnormal situations in the risk assessment stated at the beginning.

10) cropping and expanding, and a typical case of associate changes: Database, database connection in application server, database backup, database monitoring, database cluster and disaster recovery. When the user password in the database changed, the latter three which involves password changing should be changed at the same time, while the password changing which involves the cluster and the disaster recovery environment is more complex.

Figure 2:
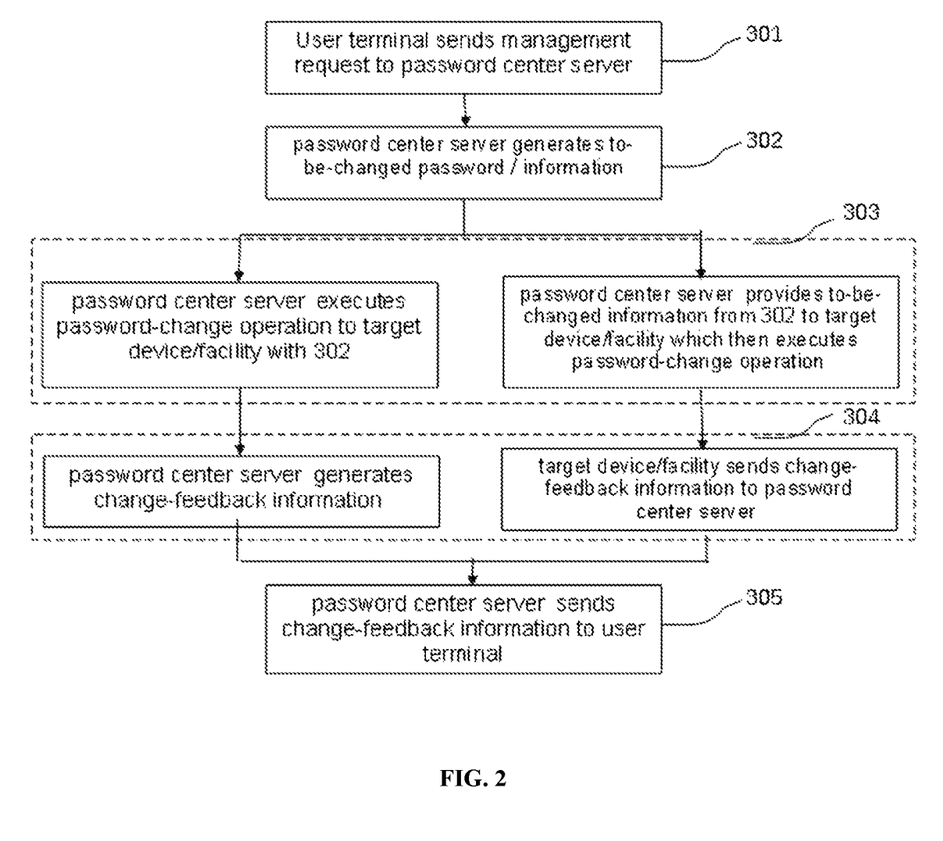
FIG. 2 is a schematic flowchart of a smart password implementation method according to an embodiment of this application.

As shown in FIG. 2, a smart password implementation method provided in the embodiments of this application may implement the following steps:

301: A user terminal sends the management request information to a password center server, where the management request information includes a password change request, a password change template setting, and a password change frequency setting;

The management request may be classified into two categories, one is those directly related to a password template and the frequency, and the other one is a password usage control, for example: 1) an account suspends login/use, an account resumes login/use (or only allows a specified address to use for a specified time), and the two functions require a device/facility management cooperation, for example, for a database it can be implemented by locking/unlocking an account. 2) requesting remote control, for example, the remote control of a specified address may be opened/closed for the remote control software supporting the callback, which requires the support of remote control software, where the format may be % R192.168.100.100:51234; 3) Authorizing others to manage the password of the designated device/facility, such as the current password lock; 4) the higher level in the organization may manage some of the devices/facilities of the lower level. Conventional management requests such as time alignment belong to the first class above, and also for example, the following description "% r causes the password generated each time to be out of order again and cannot be guessed", etc.; 5) enabling/disabling non-password login, current non-password login (fingerprint/iris/face, associated login/one-click login etc.) maybe has no restriction relationship with the password login; the password center may add a restriction relationship to ensure additional security and satisfy the occasions where necessary, combining with the time window may achieve higher security. An advantage condition for implementing the restriction relationship by the smart password system is that the user does not need to contact a specific facility.

302 The password center server generates the to-be-changed password according to the password change template, the password change request or the password change frequency, and the password center server generates to-be-changed information of the target device/facility according to the to-be-changed password, the password change request or the password change frequency; the password center server performs semantic analysis according to the user's request, generates a determined password template for the fuzzy input, determines as an available password template if the direct input precise password template meets the template semantics, directly generates for the random password, and for others generates the to-be-changed password by the password generation program according to the password change template;

303 The password center server executes a password change operation of the target device/facility according to the to-be-changed information, or the password center server provides to-be-changed information for the target device/facility, and the target device/facility performs a password change operation according to the to-be-changed information; to ensure that a change operation can be performed instead of a reset operation, some target devices/facilities further require the saved original password during decoding registration. In some embodiments, the providing manner of the to-be-changed information includes polling, by the target device/facility, to obtain to-be-changed information from a password center server, or sending, by the password center server, to-be-changed information to the target device/facility.

There are a plurality of password center servers, each of which has a unique password center identification code, and data synchronization and information pushing are performed between the plurality of password center servers. The password center server may be a single server or a server cluster. When it is a server cluster, each server cluster has a unique password center identification code respectively, and data synchronization and information pushing are performed between the plurality of server clusters.

A plurality of password center servers may be used for data sharing or disaster recovery. Each password center server itself maintains a password center trust table. A trusted password center server (such as a local server) can perform data synchronization and information pushing with a remote password center server (data of one device/facility may be pushed according to the degree of trust and needs, and may also push all data), provide functions such as smart account management and one-click login, and are more convenient for a user to use. For example, it is no more necessary to save accounts and passwords in multiple browsers, instead accounts and passwords or even an encrypted password can be directly sent (passwords generated by a system using smart password are basically always complex, thus the most are difficult to be remembered except a small number of the frequently used, in this case, one-click login is necessary, whose another meaning is to realize single sign-on through session sharing across password centers). In addition, if the user terminal installed with the password center on the same device is accidentally lost, stolen, etc. the destruction procedure can be started to ensure the security of the password center information.

A special significance of pushing to-be-changed information between two password centers: a password center pushes to-be-changed information to a target device/facility, and if the target device/facility side also has a password center, there are three cases: one is to directly execute a change regardless of the password center of the target device/facility, and the changed password may be an encrypted password; secondly, the change information, except the password template and change frequency, enters the password center of the target device/facility side, and then the change is performed by the password center of the target device/facility side; thirdly, the pushed change information includes a password template and a change frequency, and enters the password center of the target device/facility side when pushed for the first time, then the change is triggered by the password center of the target device/facility, and the subsequent push result is used as verification and update so that the effects of data sharing and incremental disaster recovery are achieved. The three cases reflect that the trust is distinct, the first is completely untrusted, while the third is fully trusted. The password change request may be a situation in which the user directly requests the change regardless of the password change frequency, but at this time, the frequency may still play a related role, so as to reflect the characteristics of the smart password, for example, being used to remind to change when it is time, etc.

. . .

The target device/facility obtains the to-be-changed information in the password center server in a polling manner, and the password center server may also push the to-be-changed information to the target device/facility in a push manner. The two forms depend on the degree of trust and the degree of difficulty of integration. If the password center is fully trusted, easy to be integrated and it belongs to the server, especially when developed and managed by the same person, then it is relatively simple to be directly executed by the password center; however, polling by the target device/facility have better flexibility, such as fitting for cross-platform, cross-device/facility type, cross-network, or having further disposal requirements for generated passwords, or needing to execute management commands, or not needing to be used as a server. Even if the password center directly executes, it may be very complicated depending on the situation of the device/facility, such as changing the password of the main board UEFI BIOS. If it's really required by the password center, the specific change execution will also be performed through a special interface program. If change tasks executed by the password center are quite heavy, it may be necessary to enable the queue mechanism which is processed by the additional queue handler program. In addition, whether to select a poll or a push in practice further depends on the security boundary. For example, it is a completely different security field where the password center pushes the change information to large-scale social, media and other platforms.

304 the password center server generates change feedback information, or the target device/facility sending change feedback information to a password center server, where the change feedback information includes a change result;

305 the password center server sends the change feedback information to the user terminal.

Figure 3:
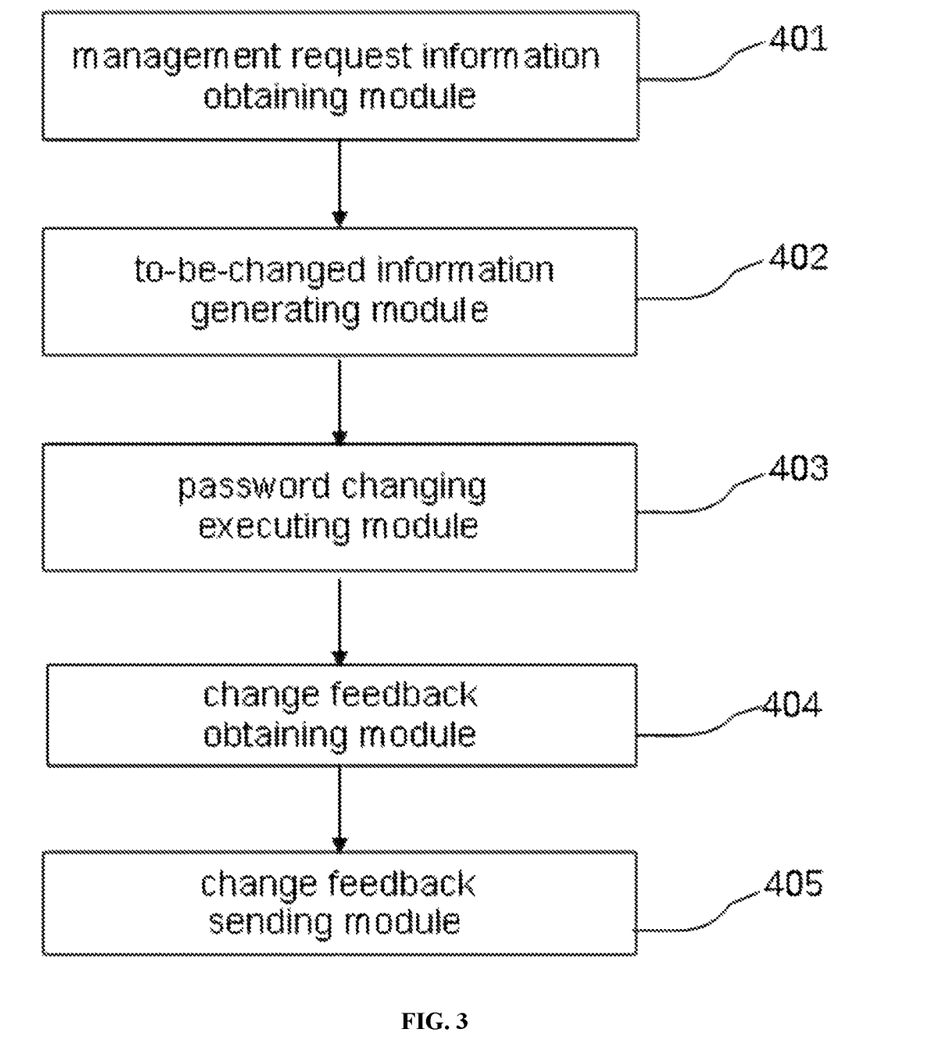
FIG. 3 is a structural framework diagram of a smart password implementation apparatus applied to a password center server according to an embodiment of this application.

As shown in FIG. 3, a smart password implementation apparatus provided in the embodiments of this application is applied to a password center server, and includes:

The management request information obtaining module 401 is configured to obtain management request information sent by a user terminal, where the management request information includes a password change request, a password change template setting, and a password change frequency setting.

a to-be-changed information generation module 402, configured to generate a to-be-changed password according to the password change template, the password change request or the password change frequency, and generate to-be-changed information of the target device/facility according to the to-be-changed password, the password change request or the password change frequency;

The password change execution module 403 is configured to execute a password change operation of the target device/facility according to the to-be-changed information, or provide the target device/facility with the to-be-changed information for executing the password change operation to the target device/facility.

The server feedback obtaining module 404 is configured to generate change feedback information, or obtain change feedback information sent by the target device/facility, where the change feedback information includes a change result.

The server feedback sending module 405, configured to send the change feedback information to the user terminal.

Figure 4:
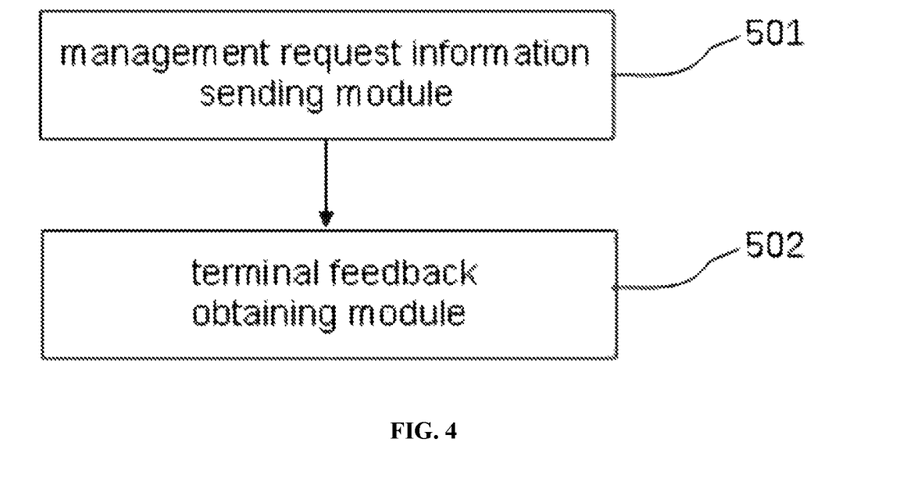
FIG. 4 is a structural frame diagram of a smart password implementation apparatus applied to a user terminal according to an embodiment of this application.

As shown in FIG. 4, a smart password implementation apparatus provided in the embodiments of this application is applied to a user terminal and includes:

The management request information sending module 501 is configured to send management request information to a password center server, where the management request information includes a password change request, a password change template setting, and a password change frequency. The password change template, the password change request, or the password change frequency are used by the password center server to generate to-be-changed information of a target device/facility, where the to-be-changed information is used by the password center server to execute a password change operation of the target device/facility and generate change feedback information, or for the target device/facilities to perform a password change operation after obtaining it from the password center server, and send change feedback information to the password center server, where the change feedback information includes a change result;

The terminal feedback obtaining module 502 is configured to obtain the change feedback information sent by the password center server.

Figure 5:
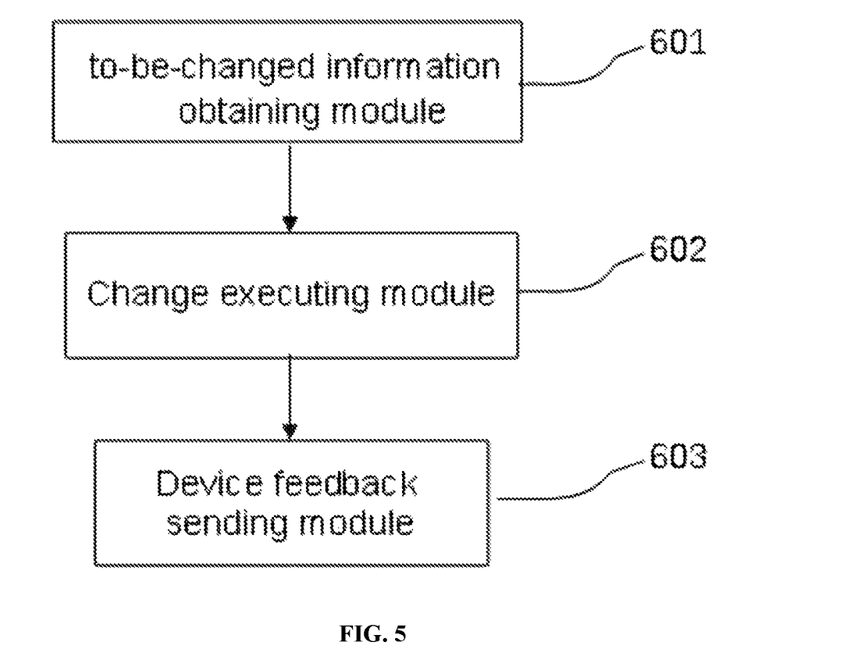
FIG. 5 is a structural framework diagram of a smart password implementation apparatus applied to a target device/facility according to an embodiment of this application.

As shown in FIG. 5, a smart password implementation apparatus provided in the embodiments of this application is applied to a target device/facility, and includes:

The to-be-changed information obtaining module 601 is configured to obtain to-be-changed information provided by a password center server, where the to-be-changed information is obtained by the target device/facility's polling a password center server or is sent by a password center server. The to-be-changed information includes a to-be-changed password, a password change request or a password change frequency, and the to-be-changed password is generated by the password center server according to a password change template, a password change request or a password change frequency, and the password change template, the password change request or the password change frequency are sent by the user terminal to the password center server.

The change execution module 602 is configured to perform a password change operation according to the to-be-changed information.

The device feedback sending module 603 is configured to send change feedback information to the password center server, where the change feedback information is used by the password center server and sent to the user terminal, and the change feedback information includes a change result.

Figure 6:
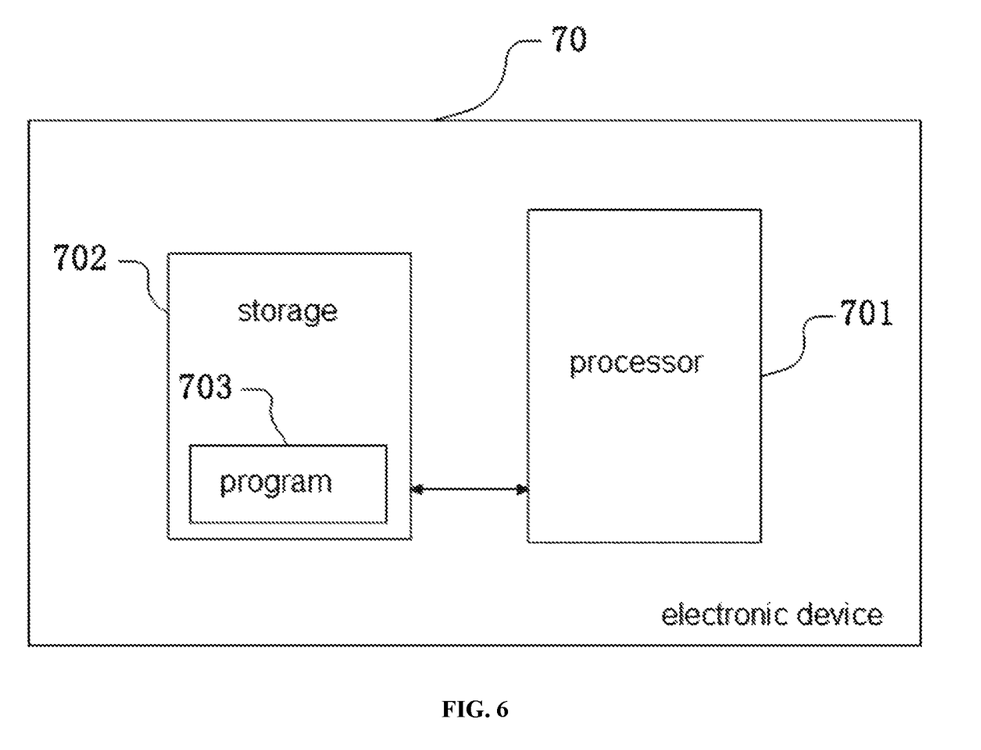
FIG. 6 is a schematic block diagram of an electronic device according to an embodiment of this application.

As shown in FIG. 6, in some possible implementations, the electronic device 70 according to the embodiments of this application may include at least one processor 701 and at least one storage device 702. The storage device 702 stores at least one computer program 703. When the computer program 703 is executed by the processor 701, the processor 701 executes the steps described in the technical solutions in the present specification according to various embodiments of the present application.

In some possible implementations, all the aspects of this application may further be implemented as a computer-readable medium on which a computer program is stored. When the computer program is executed by a processor of an electronic device, the computer program is used to implement the steps described in the technical solutions in the present specification according to various specific implementations of the present application.

It should be noted that the foregoing medium may be a readable signal medium or a readable storage medium. A readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the readable storage medium include: an electrical connection having one or more wires, a portable disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A readable signal medium may include a propagated data signal in baseband or as part of a carrier wave, with readable program code embodied therein. Such a propagated signal may take any of a variety of forms, including, but not limited to, electro-magnetic, optical signal or any suitable combination thereof. A readable signal medium may also be any readable medium that is not a readable storage medium and that can send, propagate, or transport a program for use by or in connection with an instruction execution system, apparatus, or device.

Program code embodied on a readable medium may be transmitted using any appropriate medium, including but not limited to wireless, wired, optical fiber cable, RF, etc. or any suitable combination of the foregoing.

Program code for carrying out operations of the present application may be written in one or any combination of multiple programming languages, which includes object-oriented programming languages such as Java, C++, etc. and conventional procedural programming languages such as the "C" language or similar programming languages. The program code may be executed entirely on the user's electronic device, or partly on the user's electronic device and partly on a remote electronic device, or entirely on the remote electronic device or server. In cases involving remote electronic equipment, the remote electronic device may be connected to the user's electronic device through any type of network, including a local area network (LAN) or a wide area network (WAN), or the connection may be made to an external electronic device (e.g. via internet connection with the help of an Internet Service Provider).

As will be comprehended by one skilled in the art, aspects of the present application may be embodied as a system, method, or program product. Accordingly, the implementation of the aspects of the present application may take the following forms: an entirely hardware embodiment, an entirely software embodiment (including firmware, microcode, etc.), or an embodiment combining hardware and software aspects. These may be collectively referred to as a "circuit", "module" or "system".

All of the above are preferred embodiments of the present application, and do not intend to limit the scope of protection of the present application, and therefore, the equivalent changes made according to the structure, shape and principle of the present application shall fall within the protection scope of the present application.

The invention claimed is:

1. A smart password implementation method applied to a plurality of password center servers comprising the following steps:
   obtaining, by a password center server of the plurality of password center servers, management request information sent by a user terminal, where the management request information includes a password change request, a password change template setting, and a password change frequency setting;
   generating, by the password center server, a to-be-changed password according to the password change template, the password change request or the password change frequency, and generating to-be-changed information of the target device/facility according to the to-be-changed password, the password change request or the password change frequency;
   executing, by the password center server, a password change operation of the target device/facility according to the to-be-changed information, or providing the target device/facility with the to-be-changed information for the target device/facility to execute the password change operation;
   generating, by the password center server, change feedback information, or obtaining change feedback information sent by the target device/facility, where the change feedback information includes a change result; and
   sending, by the password center server, the change feedback information to the user terminal;
   wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers.

2. The smart password implementation method according to claim 1, further comprises the following steps:
   acquiring registration request information of a target device/facility;
   sending confirmation request information of the target device/facility to a user terminal; and acquiring registration confirmation information fed back by the user terminal.

3. The smart password implementation method according to claim 2, wherein the target device/facility comprises a local device/facility, a remote device/facility, or an associated device/facility associated with the local device/facility and the remote device/facility.

4. The smart password implementation method according to claim 1, wherein the target device/facility comprises a local device/facility, a remote device/facility, or an associated device/facility associated with the local device/facility and the remote device/facility.

5. The method for implementing smart password according to claim 1, wherein the target device/facility is capable of performing a password verification, intercepting, merging, and jointing, and automatically changing the password of the target device/facility.

6. The smart password implementation method according to claim 1, wherein the password is associated with a static password, a password protection question and answer, a digital certificate, a digital asset, a port in a non-public access path, a community string, or an application context.

7. The smart password implementation method according to claim 1, wherein the management request information includes a control instruction configured to manage a password center server, manage a target device/facility, or authorize other people to manage a target device/facility; and the manner of managing the target device/facility comprises immediately shutting down, disabling or allowing login, forcing logout, and starting or stopping a service or an application.

8. A computer readable medium having a computer program stored thereon, wherein the computer program, when executed by a processor, implements the smart password implementation method according to claim 1.

9. An electronic device, comprising:
at least one processor;
a storage device configured to store at least one computer program; and when the at least one computer program is executed by the at least one processor, the at least one processor will implement the smart password implementation method according to claim 1.

10. The electronic device according to claim 9, wherein the smart password implementation method further comprises the following steps:
acquiring registration request information of a target device/facility;
sending confirmation request information of the target device/facility to a user terminal; and
acquiring registration confirmation information fed back by the user terminal.

11. The electronic device according to claim 9, wherein the target device/facility comprises a local device/facility, a remote device/facility, or an associated device/facility associated with the local device/facility and the remote device/facility.

12. The electronic device according to claim 9, wherein there are a plurality of password center servers, each of which has a unique password center identification code, and data synchronization and information pushing are performed between the plurality of password center servers; and a trusted password center server realizes the one-click login of the target device/facility managed by the other password center servers.

13. The electronic device according to claim 9, wherein the target device/facility is capable of performing a password verification, intercepting, merging, and jointing, and automatically changing the password of the target device/facility.

14. A smart password implementation method applied to a user terminal comprising the following steps:
sending management request information to a password center server of a plurality of password center servers, wherein the management request information includes a password change request, a password change template setting and a password change frequency setting; the password change template, the password change request, or the password change frequency are used by the password center server to generate a password to be changed; the to-be-changed password, the password change request, or the password change frequency are used by the password center server to generate the to-be-changed information of the target device/facility; the to-be-changed information is used by the password center server to perform a password change operation of the target device/facility and generate change feedback information, or is used for target devices/facilities to perform password change operations after obtaining it from the password center server and sending change feedback information to the password center server; the change feedback information includes a change result; and the change feedback information sent by the password center server is obtained;
wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers.

15. A smart password implementation method applied to a target device/facility comprising the following steps:
obtaining to-be-changed information provided by a password center server of a plurality of password center servers, wherein the to-be-changed information is polled and obtained by the target device/facility from the password center server or sent by the password center server; the to-be-changed information includes a to-be-changed password, a password change request, or a password change frequency; the to-be-changed password is generated by the password center server according to the password change template, the password change request, or the password change frequency; the password change template, the password change request, or the password change frequency are sent by the user terminal to the password center server;
performing a password change operation according to the to-be-changed information; and
sending the change feedback information to the password center server, where the change feedback information is used by the password center server to be sent to the user terminal, and the change feedback information includes a change result;
wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers.

16. A smart password implementation apparatus applied to a password center server of a plurality of password center servers, comprising:
a management request information obtaining module configured to obtain management request information sent by a user terminal, where the management request information includes a password change request, a password change template setting, and a password change frequency setting;
a to-be-changed information generation module configured to generate a to-be-changed password according to the password change template, the password change request, or the password change frequency, and generate to-be-changed information of the target device/facility according to the to-be-changed password, the password change request, or the password change frequency;
a password change execution module configured to execute a password change operation of the target device/facility according to the to-be-changed information, or provide the target device/facility with the to-be-changed information for the target device/facility to perform a password change operation; and
a server feedback obtaining module configured to generate change feedback information, or obtain change feedback information sent by the target device/facility, where the change feedback information includes a change result; and wherein the server feedback sending module is configured to send the change feedback information to the user terminal;
wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers.

17. A smart password implementation apparatus applied to a user terminal comprising:
a management request information sending module configured to send management request information to a password center server of a plurality of password center servers, where the management request information includes a password change request, a password change template setting, and a password change frequency setting; the password change template, the password change request, or the password change frequency are used by the password center server to generate a to-be-changed password; the to-be-changed password, the password change request, or the password change frequency are used by the password center server to generate to-be-changed information of the target device/facility, where the to-be-changed information is used by the password center server to perform a password change operation of the target device/facility and generate change feedback information, or is used for target devices/facilities to perform password change operations after obtaining it from the password center server and sending change feedback information to the password center server; the change feedback information includes a change result; and
a terminal feedback obtaining module configured to obtain the change feedback information sent by the password center server;
wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers.

18. A smart password implementation apparatus applied to a target device/facility comprising:
a to-be-changed information obtaining module configured to obtain to-be-changed information provided by a password center server of a plurality of password center servers, where the to-be-changed information is obtained by the target device/facility polling to the password center server or sent by the password center server; the to-be-changed information includes a to-be-changed password, a password change request, or a password change frequency; the to-be-changed password is generated by the password center server according to the password change template, the password change request, or the password change frequency; the password change template, the password change request, or the password change frequency is sent by the user terminal to the password center server;
a change execution module configured to perform a password change operation according to the to-be-changed information;
a device feedback sending module configured to send change feedback information to the password center server, where the change feedback information is used by the password center server to send the change feedback information to the user terminal, and the change feedback information includes a change result;
wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers.

19. A smart password implementation system, comprising: a plurality of password center servers, a user terminal connected to a password center server of the password center servers, and a target device/facility connected to the password center server; the password center server includes a smart password change implementation apparatus comprising:
a management request information obtaining module configured to obtain management request information sent by a user terminal, where the management request information includes a password change request, a password change template setting, and a password change frequency setting;

a to-be-changed information generation module configured to generate a to-be-changed password according to the password change template, the password change request, or the password change frequency, and generate to-be-changed information of the target device/facility according to the to-be-changed password, the password change request, or the password change frequency;

a password change execution module configured to execute a password change operation of the target device/facility according to the to-be-changed information, or provide the target device/facility with the to-be-changed information for the target device/facility to perform a password change operation; and a server feedback obtaining module configured to generate change feedback information, or obtain change feedback information sent by the target device/facility, where the change feedback information includes a change result; and wherein the server feedback sending module is configured to send the change feedback information to the user terminal;

wherein each of the plurality of password center servers has a unique password center identification code, and data synchronization and information pushing are performed between the plurality of password center servers; and a trusted password center server of the plurality of password center servers allows a user to perform one-click login into the target device/facility, wherein the target device/facility is managed by the trusted password center server or managed by a different password center server of the plurality of password center servers;

the user terminal includes the smart password change implementation apparatus comprising:

a management request information sending module configured to send management request information to a password center server, where the management request information includes a password change request, a password change template setting, and a password change frequency setting; the password change template, the password change request, or the password change frequency are used by the password center server to generate a to-be-changed password; the to-be-changed password, the password change request, or the password change frequency are used by the password center server to generate to-be-changed information of the target device/facility, where the to-be-changed information is used by the password center server to perform a password change operation of the target device/facility and generate change feedback information, or is used for target devices/facilities to perform password change operations after obtaining it from the password center server and sending change feedback information to the password center server; the change feedback information includes a change result; and a terminal feedback obtaining module configured to obtain the change feedback information sent by the password center server; and the target device/facility includes the smart password change implementation apparatus comprising:

a to-be-changed information obtaining module configured to obtain to-be-changed information provided by the password center server, where the to-be-changed information is obtained by the target device/facility polling to the password center server or sent by the password center server; the to-be-changed information includes a to-be-changed password, a password change request, or a password change frequency; the to-be-changed password is generated by the password center server according to the password change template, the password change request, or the password change frequency; the password change template, the password change request, or the password change frequency is sent by the user terminal to the password center server;

a change execution module configured to perform a password change operation according to the to-be-changed information;

a device feedback sending module configured to send change feedback information to the password center server, where the change feedback information is used by the password center server to send the change feedback information to the user terminal, and the change feedback information includes a change result.

* * * * *